United States Patent
Pei et al.

(10) Patent No.: US 12,484,822 B2
(45) Date of Patent: Dec. 2, 2025

(54) REAL-TIME EVALUATION METHOD AND SYSTEM FOR VIRTUAL REALITY IMMERSION EFFECT

(71) Applicant: ZHEJIANG LAB, Hangzhou (CN)

(72) Inventors: Guanxiong Pei, Hangzhou (CN); Taihao Li, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 1163 days.

(21) Appl. No.: 17/382,284

(22) Filed: Jul. 21, 2021

(65) Prior Publication Data

US 2022/0039715 A1    Feb. 10, 2022

Related U.S. Application Data

(63) Continuation of application No. PCT/CN2020/140476, filed on Dec. 29, 2020.

(30) Foreign Application Priority Data

Aug. 10, 2020 (CN) .......................... 202010795119.8

(51) Int. Cl.
*A61B 5/16* (2006.01)
*A61B 5/00* (2006.01)
(Continued)

(52) U.S. Cl.
CPC ................ *A61B 5/165* (2013.01); *A61B 5/30* (2021.01); *A61B 5/374* (2021.01); *A61B 5/378* (2021.01); *G06F 3/011* (2013.01); *G06F 17/148* (2013.01)

(58) Field of Classification Search
CPC ........... A61B 5/165; A61B 5/30; A61B 5/374; A61B 5/378; A61B 5/726; A61B 5/168;
(Continued)

(56) References Cited

U.S. PATENT DOCUMENTS

| | | | | |
|---|---|---|---|---|
| 5,029,082 A | * | 7/1991 | Shen | A61B 5/349 600/512 |
| 10,610,121 B1 | * | 4/2020 | Tucker | G16H 20/30 |
| 2020/0345287 A1 | * | 11/2020 | Lau | A61B 5/291 |

FOREIGN PATENT DOCUMENTS

| CN | 107773254 A | 3/2018 |
|---|---|---|
| CN | 110414856 A | 11/2019 |

OTHER PUBLICATIONS

PCT—search—report [Sep. 14, 2020].

* cited by examiner

*Primary Examiner* — Justin Xu
(74) *Attorney, Agent, or Firm* — Wiersch Law Group

(57) ABSTRACT

A real-time evaluation method and system for a virtual reality (VR) immersion effect are provided. An electroencephalogram signal is collected while a VR video is played, a degree of emotional arousal and a degree of cognitive absorption are calculated in real time based on energy of frequency bands $\alpha$, $\beta$, and $\theta$ that is obtained after wavelet transform, and finally, an immersion effect index is dynamically monitored for objective evaluation on an immersion effect. The method and the system realize real-time measurement and analysis, dynamically monitors a VR video immersion effect, adopts a multi-dimensional comprehensive calculation strategy and takes individual differences into account when calculating an index, effectively resolves problems such as after-fact reporting, social desirability biases, and strong subjectivity in questionnaire measurement and other measurement means, and has a broad market application prospect.

1 Claim, 2 Drawing Sheets

(51) Int. Cl.
*A61B 5/30* (2021.01)
*A61B 5/374* (2021.01)
*A61B 5/378* (2021.01)
*A61M 21/00* (2006.01)
*G06F 3/01* (2006.01)
*G06F 17/14* (2006.01)
A63F 13/211 (2014.01)
A63F 13/212 (2014.01)
A63F 13/25 (2014.01)
A63F 13/428 (2014.01)
A63F 13/5255 (2014.01)
A63F 13/67 (2014.01)
G06F 17/11 (2006.01)
G16H 20/70 (2018.01)
G16H 50/30 (2018.01)

(58) Field of Classification Search
CPC .. G06F 3/011; G06F 17/148; G06F 2203/011; G06F 3/015; G06F 17/11; G16H 50/30; G16H 20/70; G16H 50/50; A63F 13/211; A63F 13/212; A63F 13/25; A63F 13/428; A63F 13/5255; A63F 13/67; A61M 21/00; A61M 2021/005
See application file for complete search history.

REAL-TIME EVALUATION METHOD AND SYSTEM FOR VIRTUAL REALITY IMMERSION EFFECT

TECHNICAL FIELD

The present disclosure relates to the crossing field of information science and cognitive neuroscience, and specifically, to a real-time evaluation method and system for a virtual reality (VR) immersion effect.

BACKGROUND

Immersion is to enable an individual to focus on a current target situation, enter a cognitive and emotional state related to the current target situation, and forget a real external environment. Evaluation on an immersion effect mainly includes two aspects: a degree of cognitive absorption and a degree of emotional arousal.

A VR technology integrates multi-field and multi-disciplinary technologies such as computer graphics, three-dimensional (3D) display, simulation, multimedia, sensing, networks, and human-computer interaction. At present, the VR technology is widely applied in military, medical, psychological, educational, and commercial fields. A core goal of VR is to achieve immersive experience and attempt to simulate an immersive world, so that a real world and a virtual world cannot be distinguished by using naked eyes. Therefore, the immersion effect is one of key indicators to evaluate the VR technology. However, a main existing problem is that the evaluation on the immersion effect is limited to evaluation on environmental simulation, but neglects real experience of individuals. It is regarded that immersive experience and feeling are naturally obtained provided that a realistic world or object is simulated. As a result, research focuses on technology maturity, color fidelity, detail refinement, sensor sensitivity, and the like, but rarely considers people's real cognitive and sensory feedbacks and ignores subjectivity of a person as a user. Existing evaluation methods for an immersion effect of an individual rely more on scale analysis and subjective reports, and objective and procedural evaluation methods for the immersion effect are lacking.

When a human brain works, a spontaneous electrophysiological activity is generated due to voltage fluctuation produced by an ionic current of neurons in the brain. A weak bioelectrical signal is detected on the scalp, and then amplified and recorded to obtain an electroencephalogram (EEG), to reflect physiological and psychological information of an individual. Through discrete Fourier transform, fast Fourier transform, wavelet transform, or the like, an acquired EEG signal is converted into a frequency domain signal including consecutive spectrum signals. These signals can be divided into five frequency bands by frequency: δ (0.5-4 Hz), θ (4-8 Hz), α (8-12 Hz), β (12-30 Hz), and γ (30-60 Hz). Research shows that an EEG signal is closely related to an emotional state and an absorption degree of an individual. The α wave represents an association between conscious thinking and subconsciousness, and can help people calm down when necessary and promote relaxation and rest. The β wave represents brain consciousness, logical thinking, and stress reaction activities, and is closely related to an excitement degree of an individual. The θ wave represents a degree of immersion and absorption, and has a strong correlation with attention of an individual.

SUMMARY

To realize procedural, objective and visual evaluation on a VR immersion effect, the present disclosure provides a real-time evaluation method and system for a VR immersion effect, to collect EEG data of a participant by using a multi-channel EEG measurement device and perform real-time dynamic analysis on an immersion effect, to achieve agile data processing and visualization.

The objective of the present disclosure is achieved by the following technical solutions.

A real-time evaluation method for a VR immersion effect includes the following steps:

S1: equipping a participant with a VR imaging apparatus and a multi-channel electroencephalogram measurement device, and collecting an electroencephalogram signal of the participant by the multi-channel EEG measurement device;

S2: collecting an electroencephalogram signal of the participant in a resting state, and performing preprocessing and wavelet transform on the collected electroencephalogram signal in sequence to obtain a mean degree of emotional arousal and a mean degree of cognitive absorption in the resting state;

S3: playing a 3D video as a visual stimulus source to the participant by using the VR imaging apparatus, to enable the participant to be in a virtual environment with relatively closed vision and hearing, and collecting an original electroencephalogram signal synchronously;

S4: performing real-time preprocessing and wavelet transform on original electroencephalogram signals of electrodes located in prefrontal and anterior temporal regions, to obtain rhythm waves and energy of frequency bands α, β, and θ;

S5: calculating a real-time degree of emotional arousal and a real-time degree of cognitive absorption based on results of S2 and S4;

S6: calculating an immersion index in real time based on the degree of emotional arousal and the degree of cognitive absorption in S5; and S7: evaluating and grading an immersion effect based on a time-varying curve of the immersion index.

In an embodiment, formulas for calculating the mean degree of emotional arousal and the mean degree of cognitive absorption are as follows:

$$L_A = \frac{1}{mn}\sum_{i=1}^{m}\sum_{j=1}^{n}\frac{\beta_{ij}}{\alpha_{ij}}, \text{ and}$$

$$L_F = \frac{1}{mn}\sum_{i=1}^{m}\sum_{j=1}^{n}\frac{\theta_{ij}+\alpha_{ij}}{\beta_{ij}},$$

where $L_A$ represents the mean degree of emotional arousal; $L_F$ represents the mean degree of cognitive absorption; i represents time, namely, an $i$th second; m represents measurement duration in the resting state, in other words, the measurement lasts m seconds; j represents an electroencephalogram acquisition position, namely, a $j^{th}$ electrode; and n represents a quantity of electrodes, in other words, there are a total of n electrodes.

In an embodiment, formulas for calculating the degree of emotional arousal and the degree of cognitive absorption in S5 are as follows:

$$A_i = \frac{1}{n}\sum_{j=1}^{n}\frac{\frac{\beta_{ij}}{\alpha_{ij}}L_A}{L_A},$$

$$F_i = \frac{1}{n}\sum_{j=1}^{n}\frac{\frac{\theta_{ij}+\alpha_{ij}}{\beta_{ij}}L_F}{L_F},$$

where $A_i$ represents the degree of emotional arousal, and $F_i$ represents the degree of cognitive absorption.

In an embodiment, a formula for calculating the immersion index in S6 is as follows:

$$E_i = \lambda * A_i + (1-\lambda)F_i,$$

where $\lambda \in [0, 1]$, and its specific value is determined based on the feature of video content.

In an embodiment, when the electroencephalogram signal is collected, based on an international 10-20 system and related brain regions, electrodes F7 and F8 are selected for calculating the degree of emotional arousal, and electrodes FP1, FPz, and FP2 are selected for calculating the degree of cognitive absorption.

In an embodiment, the evaluating and grading an immersion effect in S6 is as follows: evaluating the immersion effect as sufficient when immersion coefficient $E_i \geq 0.8$, as good when $0.4 \leq E_i \leq 0.8$, and as insufficient when $E_i \leq 0.4$.

A real-time evaluation system for a VR immersion effect includes:
- the VR imaging apparatus, configured to display the 3D video as the visual stimulus source;
- the multi-channel electroencephalogram measurement device, configured to collect an electroencephalogram signal of the participant, and transmit the electroencephalogram signal to a VR immersion effect calculation unit; and
- the VR immersion effect calculation unit, including an electroencephalogram signal preprocessing module, an immersion effect calculation module, and a data visualization module, where the electroencephalogram signal preprocessing module is configured to perform preprocessing on collected electroencephalogram information, and the preprocessing includes signal amplification and filtering; the immersion effect calculation module is configured to perform wavelet transform on preprocessed electroencephalogram data to obtain rhythm waves and energy of different frequency bands $\alpha$, $\beta$, and $\theta$, calculate a degree of emotional arousal and a degree of cognitive absorption in real-time, and generate the immersion index; and the data visualization module is configured to display the time-varying curve of the immersion index.

The present disclosure has the following beneficial effects:
1. The high time resolution of EEG is invaluable. Therefore, the evaluation system for a VR immersion effect in the present disclosure realizes real-time measurement and analysis, supports procedural and whole-process analysis on the VR video, and effectively resolves problems such as after-fact reporting, social desirability biases, and strong subjectivity in questionnaire measurement and other measurement methods.
2. The real-time evaluation method for a VR immersion effect in the present disclosure adopts a multi-dimensional comprehensive calculation strategy and takes individual differences into account, and can scientifically and comprehensively analyze the immersion effect.
3. The system in the present disclosure has a visualization function to help a user intuitively obtain data of the immersion effect, thereby making reasonable suggestions. In addition, due to the non-invasive security and low costs, the system can be commercially used in VR game scene evaluation, VR movie clip screening and editing, VR exhibition hall effect evaluation, VR education, attention training, and other fields, and has a broad market prospect.

DETAILED DESCRIPTION

The present disclosure is described in detail with reference to accompanying drawings and preferred embodiments, to make the objective and effect of the present disclosure clearer. It should be understood that the specific embodiments described herein are merely intended to illustrate the present disclosure and are not intended to limit the present disclosure.

Figure 1:
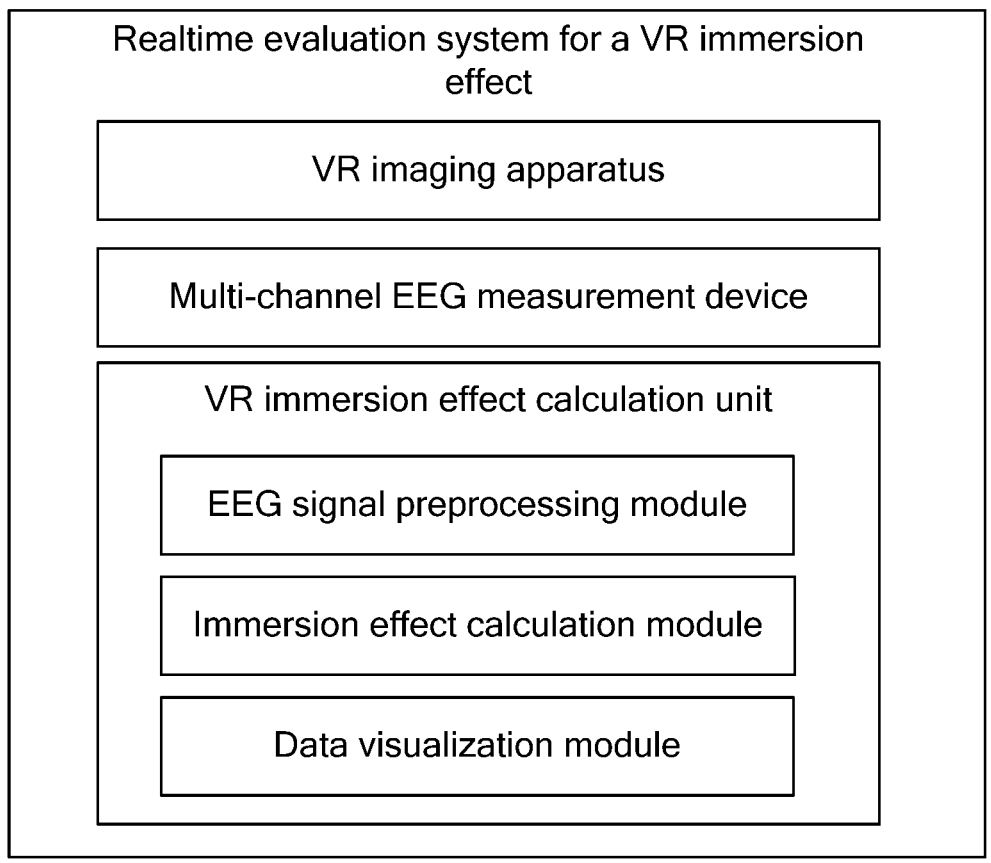
FIG. 1 is a schematic diagram of a real-time evaluation system for a VR immersion effect according to the present disclosure.

As shown in FIG. 1, a real-time evaluation system for a VR immersion effect in the present disclosure includes a VR imaging apparatus, a multi-channel EEG measurement device, and a VR immersion effect calculation unit.

The VR imaging apparatus is configured to build a VR video scene platform, and display a 3D video as a visual stimulus source. A professional product such as HTC VIVE Pro® is usually selected to reduce impact of a screen-door effect.

The multi-channel EEG measurement device is configured to collect an EEG signal of a participant, and transmit the EEG signal to the VR immersion effect calculation unit. The device includes a 16-channel electrode cap, a junction box, an amplifier, a computer host, and the like. In a measurement process, a voltage error is not greater than 0±10%, input noise is ≤0.5 uV RMS, a common-mode rejection ratio is greater than 110 dB, high sensitivity and a strong anti-interference capability are required, and there is no time delay, so that the EEG signal of the participant is collected accurately in real time. Sampled data is stored and backed up after undergoing analog-to-digital conversion by the amplifier. The VR device transmits a time stamp to EEG data by using the host and based on TCP/IP, so that the video corresponds to the EEG data to subsequently export and analyze offline the EEG data. Configurations of the host used by the system are as follows: CPU: Intel® Core™ i7-9700, equivalent or higher configuration; GPU: NVIDIA GeForce® RTX 2080 Super™, equivalent or higher configuration; and memory: 32 GB RAM or above. In addition, EEG data of certain duration will be packaged and uploaded to the VR immersion effect calculation unit in real time.

The VR immersion effect calculation unit includes an EEG signal preprocessing module, an immersion effect calculation module, and a data visualization module. The EEG signal preprocessing module performs, by using data obtained from the amplifier of the multi-channel EEG measurement device, a notch filter, and a low-pass filter, data filtering, reorganization, interference removal, and artifact removal on the collected EEG data, including removal of noise signal interference caused by eye movement, head movement, and swallowing. The immersion effect calculation module is configured to perform wavelet transform on preprocessed EEG data to obtain rhythm waves and energy of different frequency bands, calculate a degree of emotional arousal and a degree of cognitive absorption in real time, generate an immersion index, and send a related index value to the data visualization module in real time. The data visualization module is configured to display a time-varying curve of the immersion index, to help a user monitor a VR video immersion effect and form a scientific decision.

Figure 2:
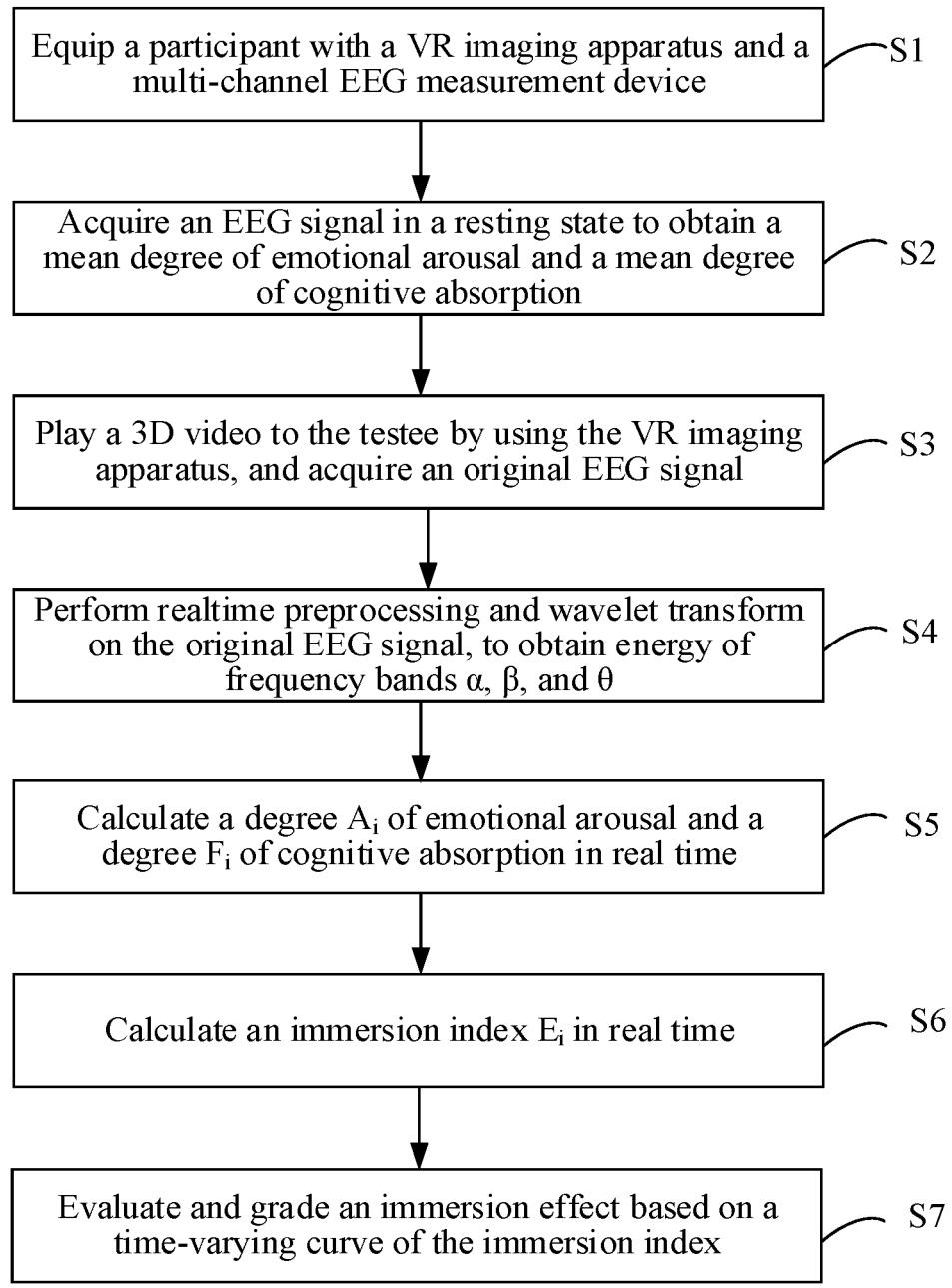
FIG. 2 is a flowchart of a real-time evaluation method for a VR immersion effect according to the present disclosure.

As shown in FIG. 2, a real-time evaluation method for a VR immersion effect in the present disclosure is implemented based on the foregoing real-time evaluation system, and specifically includes steps of S1 to S7.

At step S1, a participant is equipped with a VR imaging apparatus and a multi-channel EEG measurement device, and an EEG signal of the participant is collected by the multi-channel EEG measurement device.

Impedance of each electrode remains below 5 kΩ by injecting conductive adhesive to a 16-channel electrode cap. An electrode position is determined based on an international 10-20 system.

At step S2, an EEG signal of the participant in a resting state is collected, and preprocessing and wavelet transform are performed on the collected EEG signal in sequence to obtain a mean degree of emotional arousal and a mean degree of cognitive absorption in the resting state.

At first, EEG signals of 60 seconds are recorded for the participant in the case of a blank screen, and a sampling frequency is 1 Hz. Then, the EEG signals in the resting state are preprocessed in real time by using an amplifier, a notch filter, and a low-pass filter, to remove noise signal interference caused by eye movement, head movement, and swallowing, and obtain preprocessed EEG data. Wavelet transform is performed on the preprocessed EEG data in the resting state to obtain rhythm waves and energy of frequency band $\alpha$, $\beta$, and $\theta$. The mean degree $L_A$ of emotional arousal and the mean degree $L_F$ of cognitive absorption in the resting state are calculated according to the following formulas:

$$L_A = \frac{1}{120} \sum_{i=1}^{60} \sum_{j=1}^{2} \frac{\beta_{ij}}{\alpha_{ij}}, \text{ and}$$

$$L_F = \frac{1}{180} \sum_{i=1}^{60} \sum_{j=1}^{3} \frac{\theta_{ij} + \alpha_{ij}}{\beta_{ij}}$$

Electrode F7 and F8 are selected for calculating the degree of emotional arousal, and electrodes FP1, FPz, and FP2 are selected for calculating the degree of cognitive absorption. In the foregoing formulas, i represents time, namely, an $i^{th}$ second; and j represents an EEG acquisition position, namely, a $j^{th}$ electrode.

At step S3, a 3D video as a visual stimulus source is played to the participant by the VR imaging apparatus, to enable the participant to be in a virtual environment with relatively closed vision and hearing, and acquire an original EEG signal synchronously.

At step S4, real-time preprocessing and wavelet transform are performed on original EEG signals of electrodes located in prefrontal and anterior temporal regions, to obtain the rhythm waves and the energy of the frequency bands $\alpha$, $\beta$, and $\theta$.

At step S5, a real-time degree $A_i$ of emotional arousal and a real-time degree $f_i$ of cognitive absorption are calculated based on results of S2 and S4 according to the following formulas:

$$A_i = \frac{1}{2} \sum_{j=1}^{2} \frac{\frac{\beta_{ij}}{\alpha_{ij}} - L_A}{L_A}, \text{ and}$$

$$F_i = \frac{1}{3} \sum_{j=1}^{3} \frac{\frac{\theta_{ij} + \alpha_{ij}}{\beta_{ij}} - L_F}{L_F}.$$

At step S6, an immersion index E in real time is calculated based on the degree of emotional arousal and the degree of cognitive absorption in S5 according to the following formula:

$$E_i = \lambda * A_i + (1-\lambda) F_i.$$

In the foregoing formula, $\lambda \in [0, 1]$, and its specific value is determined based on characteristics of a VR video. For a video material for emotion smoothing, for example, a natural scenery or a garden landscape, $\lambda < 0.4$ is recommended. For a video material with rich emotions, for example, a life clip or a daily conversation, $0.4 \leq \lambda < 0.6$ is recommended. For a video material with a strong emotion stimulation capability, for example, a movie climax, a game scene, or a simulation animation, $\lambda \geq 0.6$ is recommended.

At step S7, an immersion effect are evaluated and graded based on a time-varying curve of the immersion index, where the immersion effect is evaluated as sufficient when immersion coefficient $E_i \geq 0.8$, as good when $0.4 \leq E_i < 0.8$, and as insufficient when $E_i < 0.4$.

A person of ordinary skill in the art can understand that the above descriptions are only preferred examples of the present disclosure and are not intended to limit the present disclosure. Although the present disclosure is described in detail with reference to the foregoing examples, a person skilled in the art can still make modifications to the technical solutions described in the foregoing examples, or make equivalent replacement to some technical characteristics. Any modifications and equivalent substitutions made within the spirit and scope of the present disclosure should be included within the protection scope of the present disclosure.

What is claimed is:

1. A real-time evaluation method for a virtual reality (VR) immersion effect, comprising following steps:
   S1: equipping a participant with a VR imaging apparatus with headphones and a multi-channel electroencephalogram measurement device and collecting an electroencephalogram signal of the participant by the multi-channel electroencephalogram measurement device, wherein when collecting the electroencephalogram signal, based on an international 10-20 system and related brain region distribution, electrodes F7 and F8 are selected for calculating a degree of emotional arousal, and electrodes FP1, FPz, and FP2 are selected for calculating a degree of cognitive absorption;
   S2: collecting an electroencephalogram signal of the participant in a resting state and performing preprocessing on the collected electroencephalogram signal to remove noise signal interference and obtain preprocessed EEG data, performing wavelet transform on the preprocessed EEG data to yield rhythm waves and energy of different frequency bands $\alpha$, $\beta$, and $\theta$ for i time points and j electrodes, designated as $\alpha_{ij}$, $\beta_{ij}$, and $\theta_{ij}$, and inputting the rhythm waves and energy of different frequency bands $\alpha$, $\beta$, and $\theta$ for i time points and j electrodes into a formula for calculating a mean degree of emotional arousal and a formula for a mean degree of cognitive absorption to obtain the mean degree of emotional arousal and the mean degree of cognitive absorption in the resting state, wherein the formula for calculating the mean degree of emotional arousal and the formula for the mean degree of cognitive absorption are as follows:

$$L_A = \frac{1}{mn}\sum_{i=1}^{m}\sum_{j=1}^{n}\frac{\beta_{ij}}{\alpha_{ij}}, \text{ and } L_F = \frac{1}{mn}\sum_{i=1}^{m}\sum_{j=1}^{n}\frac{\theta_{ij}+\alpha_{ij}}{\beta_{ij}},$$

wherein $L_A$ represents the mean degree of emotional arousal; $L_F$ represents the mean degree of cognitive absorption; i represents time, namely, an $i^{th}$ second; m represents measurement duration in the resting state, in other words, a measurement lasts m seconds; j represents an electroencephalogram collection position, namely, a $j^{th}$ electrode; and n represents a quantity of electrodes, in other words, in the formula for the mean degree of emotional arousal, n=2, and in the formula for the mean degree of cognitive absorption, n=3;

S3: playing a three-dimensional (3D) video as a visual stimulus source to the participant by using the VR imaging apparatus with headphones to enable the participant to be in a virtual environment with relatively closed vision and hearing; and collecting an original electroencephalogram signal synchronously;

S4: performing real-time preprocessing and wavelet transform on original electroencephalogram signals of electrodes located in prefrontal and anterior temporal regions to obtain rhythm waves and energy of frequency bands $\alpha$, $\beta$, and $\theta$;

S5: calculating a real-time degree of emotional arousal and a real-time degree of cognitive absorption based on results of S2 and S4 based on following formulas:

$$A_i = \frac{1}{n}\sum_{j=1}^{n}\frac{\frac{\beta_{ij}}{\alpha_{ij}}-L_A}{L_A}, \text{ and}$$

$$F_i = \frac{1}{n}\sum_{j=1}^{n}\frac{\frac{\theta_{ij}+\alpha_{ij}}{\beta_{ij}}-L_F}{L_F},$$

wherein $A_i$ represents the degree of emotional arousal, and $F_i$ represents the degree of cognitive absorption;

S6: calculating an immersion index in real time based on the degree of emotional arousal and the degree of cognitive absorption in S5 based on following formula:

$E_i = \lambda * A_i + (1-\lambda) F_i,$ wherein $\lambda \in [0,1]$, and its specific value is determined based on a feature of video content; and S7: grading an immersion effect into three levels based on a time-varying curve of the immersion index, in such a manner to convert a spontaneous electrophysiological activity generated in a user's brain during human brain works into a quantified and visualized immersion index, and to provide a personalized immersion evaluation report and suggestions for a user, wherein the immersion effect is evaluated as being at a first level when the immersion index $E_{ix0} \geq 0.8$, the immersion effect is evaluated as being at a second level when $0.4 \leq E_i < 0.8$, and the immersion effect is evaluated as being at a third level when $E_i < 0.4$.

* * * * *